United States Patent [19]

Kawasaki et al.

[11] Patent Number: 4,715,419
[45] Date of Patent: Dec. 29, 1987

[54] LARGE-SIZE PNEUMATIC RADIAL TIRE FOR USE ON ROUGH ROAD WITH BELT HAVING SPECIFIED CORD

[75] Inventors: Kiyohito Kawasaki; Michitaka Sato, both of Akigawa; Hiroyuki Koseki, Ohmiya; Tamotsu Matsunuma, Urawa, all of Japan

[73] Assignee: Bridgestone Corporation, Tokyo, Japan

[21] Appl. No.: 675,591

[22] Filed: Nov. 28, 1984

[30] Foreign Application Priority Data

Nov. 28, 1983 [JP] Japan .................... 58-222212

[51] Int. Cl.$^4$ .................. B60C 9/00; D07B 1/06
[52] U.S. Cl. .................... 152/527; 57/902; 152/535
[58] Field of Search ............ 152/359, 356 R, 361, 152/361 DM, 451, 527, 535, 536; 57/902, 906

[56] References Cited

U.S. PATENT DOCUMENTS

| | | | |
|---|---|---|---|
| 4,258,543 | 3/1981 | Canevari et al. | 152/451 |
| 4,333,306 | 6/1982 | Yamashita et al. | 152/359 |
| 4,399,853 | 8/1983 | Morimoto et al. | 152/361 R |
| 4,488,587 | 12/1984 | Umezawa et al. | 152/361 R |
| 4,506,500 | 3/1985 | Miyauchi et al. | |
| 4,509,318 | 4/1985 | Yoneda | 57/902 |

*Primary Examiner*—Michael Ball

*Attorney, Agent, or Firm*—Sughrue, Mion, Zinn, Macpeak & Seas

[57] ABSTRACT

A large-size pneumatic radial tire for use on rough road is disclosed, which comprises as a tire reinforcement a carcass ply of cords arranged in a direction substantially perpendicular to the equatorial plane of the tire and a belt composed of at least three cord layers each containing steel cords embedded parallel to each other in rubber and arranged at a relatively small angle with respect to the equatorial plane of the tire, at least a pair of adjacent cord layers among which being piled one upon the other to cross their cords with each other at an angle of 15°–30° with respect to the equatorial plane. In this type of the tire, the outermost cord layer for the belt is a cord layer formed by embedding a plurality of twisted steel cords, each having a single layer construction of 1×3, 1×4 or 1×5 or a double layer construction with a core of 1 to 2 filaments obtained by twisting plural steel filaments shaped prior to the formation of cord, in rubber at a cord volume fraction of 5–40% so as to provide a sealing type penetration form wherein a portion of the cord having an inner space completely filled with the penetrated rubber and a length $l_1$ is alternately connected with a portion of the cord having an inner space incompletely filled with the penetrated rubber and a length $l_2$ in the longitudinal direction of the cord so as to satisfy $l_2$ of not more than 10 mm and $l_1/l_2$ of not less than 0.14.

7 Claims, 16 Drawing Figures

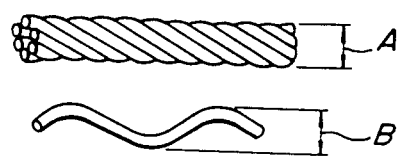
FIG_1a
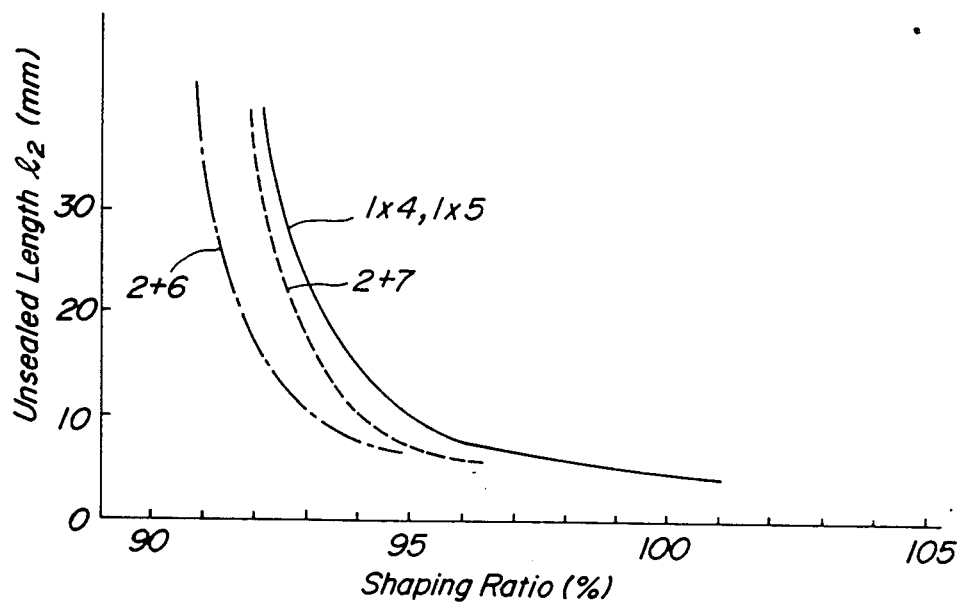
FIG_1b

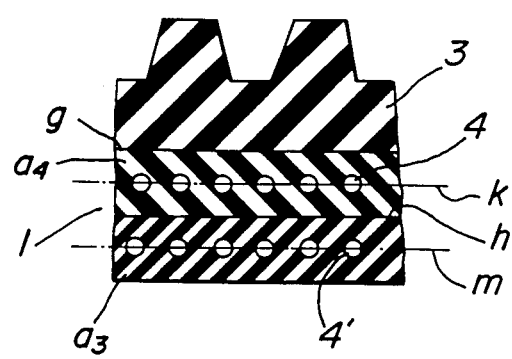
FIG_2a
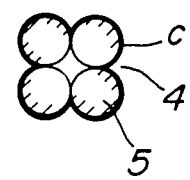
FIG_2b
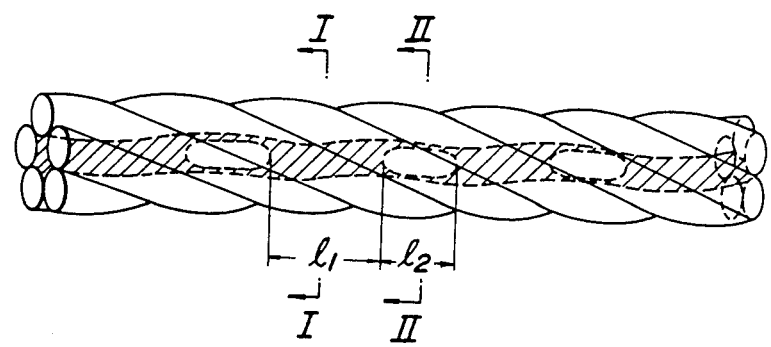
FIG_3a
FIG_3b  FIG_3c

LARGE-SIZE PNEUMATIC RADIAL TIRE FOR USE ON ROUGH ROAD WITH BELT HAVING SPECIFIED CORD

BACKGROUND OF THE INVENTION

1. Field of the Invention

This invention relates to a large-size pneumatic radial tire for use on rough road, and more particularly to a large-size pneumatic radial tire having improved durability in the running on rough road by using a steel cord having a particular shape and a sealing-type rubber penetration form as an outermost cord layer for belt.

2. Description of the Prior Art

Heavy duty pneumatic radial tires for trucks and buses using steel cords as a reinforcement for the belt and the carcass are used not only in the running on good roads inclusive of completely paved and managed road but also in the running on rough roads having a poor road surface state such as a construction road or the like. Particularly, in case of the running on roads inclusive of rough roads, there are frequently caused problems of separation failure between tread and belt (hereinafter abbreviated as TLB), i.e. abnormal drop of tire use life due to peeling break of tread rubber layer from belt at an initial use stage of tire, impossibility of recapping tread rubber layer due to peeling and cut failure of tread accompanied with extremely poor appearance at a last use life stage, and the like.

As a cause of generating such a TLB, it is thought that water begins to penetrate form the exterior into the inside of the cord together with the cord breaking up of the belt due to cut failure or the like of the tread and then the penetrating water easily progresses in the inside of the cord along the cord direction because the penetrability of rubber into the inside of the conventional cord is poor, whereby the interface between rubber and cord is degraded by water to cause TLB. As a countermeasure against TLB, it has hitherto been attempted to use a high extensible cord of a strand construction as an outermost cord layer for the belt in order to reduce cord cut among the causes producing TLB. The use of such a strand construction cord certainly reduces the cord cut and also protects a cord layer beneath the outermost cord layer because of a large extension. However, this cord is poor in rubber penetrability into the inside of the strand, so that after the cut reaches to the cord, water easily progresses in the inside of the cord independently of the presence or absence of the cut of the cord itself to cause TLB. Therefore, the problem of TLB has not satisfactorily been solved by the use of the strand construction cord. Moreover, in the above high extensible cord, the weight per cord length is large, but the tensile strength is small and also the cost per unit weight of cord is expensive.

SUMMARY OF THE INVENTION

The invention advantageously and adequately solves the problems on the durability, particularly TLB in large-size pneumatic radial tires for use on rough road.

The inventors have directed attention to the progressing of water in the inside of the cord among the causes producing TLB, and made various studies with respect to the prevention of such a water progressing, and found out that the object can be achieved by using a steel cord of a particular shape as an outermost cord layer for belt to make the penetration of rubber into the inside of the cord to a particular form, and as a result the invention has been accomplished.

According to the invention, there is the provision of a large-size pneumatic radial tire for use on rough road comprising as a tire reinforcement a carcass ply of cords arranged in a direction substantially perpendicular to the equatorial plane of the tire and a belt composed of at least three cord layers each containing steel cords embedded parallel to each other in rubber and arranged at a relatively small angle with respect to the equatorial plane of the tire, at least a pair of adjacent cord layers among which being piled one upon the other to cross their cords with each other at an angle of 15°-30° with respect to the equatorial plane, characterized in that an outermost cord layer for said belt is a cord layer formed by embedding a plurality of twisted steel cords, each having a single layer construction of $1\times3$, $1\times4$ or $1\times5$ or a double layer construction with a core of 1 to 2 filaments obtained by twisting plural steel filaments shaped prior to the formation of cord, in rubber at a cord volume fraction of 5–40%, which is expressed by a percentage of the sum of sectional areas of cords included in an area of a region defined by a bisector between a line passing through centers of the cords in the outermost cord layer for the belt and a line passing through centers of the cords in an inner cord layer adjacent to the outermost cord layer and a borderline between the tread and the outermost cord layer in section perpendicular to the circumferential direction of the belt, in such a manner that the form of penetrating rubber into the inside of the cord is a sealing type penetration form wherein a portion of the cord having an inner space completely filled with the penetrated rubber and a longitudinal length $l_1$ is alternately connected with a portion of the cord having an inner space incompletely filled with the penetrated rubber and a longitudinal length $l_2$ in the longitudinal direction of the cord so as to satisfy $l_2$ of not more than 10 mm and $l_1/l_2$ of not less than 0.14.

BRIEF DESCRIPTION OF THE DRAWING

The invention will now be described with reference to the accompanying drawing, wherein:

FIG. 1a is a schematic view illustrating a shaped state of steel filament constituting the cord according to the invention;

FIG. 1b is a graph showing a relation between the shaping ratio and the unsealed length;

FIGS. 2a and 2b are schematically sectional views illustrating a cord volume fraction in the belt;

FIG. 3a is a schematic view illustrating the rubber penetration form;

FIGS. 3b and 3c are sectional views taken along lines I—I and II—II of FIG. 3a, respectively;

DETAILED DESCRIPTION OF THE INVENTION

Figure 4A:
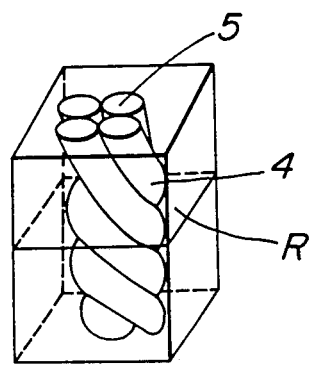
FIGS. 4a and 4b are schematic views illustrating the inspection state for the rubber penetration form in the cord, respectively.

According to the invention, it is preferable that the outermost cord layer of the belt have a width corresponding to 30–80% of the tread maximum width. When the width of the outermost cord layer is less than 30% of the tread maximum width, that portion of the tread which is apt to cause a cut failure cannot be protected sufficiently. When it exceeds 80%, a crack length produced at each end of a third cord layer adjacent to the outermost cord layer becomes excessively large and also the outermost cord layer covers extra that portion of the tread which is less to cause cut failure, so that the tire weight becomes heavy and the cost becomes higher.

In the cord to be used in the outermost cord layer according to the invention, it is necessary that steel filaments constituting the cord are subjected to shaping prior to the formation of the cord, i.e. the shape similar to the filament shape in the twisted cord is previously given to the filament prior to the formation of the cord by the application of a stress exceeding elastic limit. Thereby, a rubber penetration form required for achieving the object of the invention is obtained. The degree of the above shaping is expressed by the following equation:

$$\text{Shaping ratio} = B/A \times 100(\%)$$

wherein A and B are a maximum size of the steel filament in the cord and a maximum amplitude of the steel filament disentangled from the cord as shown in FIG. 1a, respectively. If the shaping ratio of the filament is small, the cord is formed by closing the filaments to each other, so that a gap between the filaments becomes small and the rubber penetrability is poor. According to the invention, therefore, the shaping ratio is favorable to be not less than 95% in case of the single layer construction cord and not less than 93% in case of the double layer construction cord. This shaping ratio is interrelated to an unsealed length $l_2$ in the cord, which is shown in FIG. 1b. That is, when a twisting angle is within a range defined in the invention, the shaping ratio has an influence on whether the cord is a sealing type or an unsealing type. As apparent from FIG. 1b, the smaller the shaping ratio, the longer the unsealed length $l_2$, resulting in the degradation of the rubber penetrability, which can not achieve the object of the invention. The upper limit of the shaping ratio may be 120% in view of the restriction on production techniques. However, if the shaping ratio is too high, the diameter of the cord becomes non-uniform in the longitudinal direction of the cord and the shape in longitudinal direction of the cord shows a large undulation. As a result, the external force is apt to concentrate in convex portions and the occurrence of TLB extremely increases. In any cords, therefore, the shaping ratio is preferable to be not more than 110%. When the shaping ratio is within the above range defined in the invention, the optimum rubber penetration form for preventing the progress of water in the inside of the cord is provided to prevent the occurrence of TLB.

As the single layer construction of the cord according to the invention, use may be made of $1 \times 3$, $1 \times 4$ and $1 \times 5$ constructions, among which the use of $1 \times 4$ or $1 \times 5$ construction is preferable. Particularly, it is favorable to use $1 \times 4$ or $1 \times 5$ construction having a filament diameter of 0.30–0.40 mm and a twisting angle of 10°–20°. The term "twisting angle" used herein means an angle defined between the axial direction of the filament and the twisting direction thereof. In case of the cord of $1 \times 3$ single layer construction, the tensile strength is too small and the end count is critical even if these cords are densely embedded in rubber in the actual production of the tire, so that the rigidity of the belt as a composite body becomes small and the wear resistance under the running condition on substantially good road is poor as compared with the case of using cords of $1 \times 4$ or $1 \times 5$ construction densely embedded, but the wear resistance on roads including rough road is equal to that using the cord of $1 \times 4$ or $1 \times 5$ construction. On the other hand, in case of using a cord of $1 \times 6$ single layer construction, the cord structure is unstable and the filaments constituting the cord easily fall into the inside of the cord, so that it is difficult to render the rubber penetration form into a sealing type.

When the filament diameter is less than 0.30 mm, the cut resistance of the cord is degraded by stones or the like scattered on road surface, while when it exceeds 0.40 mm, the cut resistance of the cord tends to be degraded by corrosion fatigue. Further, when the twisting angle is smaller than 10°, the portion of unsealed length $l_2$ becomes long, and the nucleus for the occurrence of TLB is large to promote the growth of TLB, and the cutting property of the cord is poor. Conversely, when the twisting angle is larger than 20°, the unsealed length $l_2$ is extremely long, and the rubber penetration form is not a sealing type, and the resistance to TLB is degraded.

According to the invention, $2+7$ or $2+6$ construction is favorably used as a double layer construction. Particularly, it is preferable to use the cord of $2+7$ or $2+6$ construction having a filament diameter of 0.23–0.40 mm and a twisting angle of 10°–20°. Because, when the diameter of the core filament is equal to that of the sheath filament, if the number of sheath filaments is 8 or more, a gap between filaments is not formed due to the sticking of the filaments and rubber does not penetrate into the inside of the cord, while if the number of sheath filaments is 5 or less, the sheath filaments are biased to make a stress distribution non-uniform. The limitation on the ranges of the filament diameter and twisting angle is based on the similar reasons to the case of the single layer construction as previously mentioned.

The definition of the cord volume fraction will be explained with reference to an example of FIG. 2a. That is, when a bisector between a link k passing through centers of cords 4 in an outermost cord layer $a_4$ (fourth cord layer) and a line m passing through centers of cords 4' in an inner cord layer $a_3$ adjacent to the outermost cord layer (third cord layer) is h and a borderline between tread 3 and outermost cord layer $a_4$ is g in section perpendicular to circumferential direction of belt 1, the cord volume fraction is expressed by a percentage of a sum of sectional areas of cords 4 to an area of the portion of the belt defined between the bisector h and the borderline g. Moreover, the term "sectional area of cord" used herein means an area of a shadowed region surrounded by a bold line c being an outer peripheral line of the cord 4 composed of plural filaments 5 as shown in FIG. 2b.

When the cord volume fraction is less than 5%, the end count becomes very rough, so that the outermost cord layer does not act as a protector and consequently cut failure easily reaches to the inner cord layer adjacent to the outermost cord layer to thereby frequently produce cut burst. When the cord volume fraction exceeds 40%, the distance between cords is too narrow in view of tire production techniques, so that the closely sticking between the cords is caused or the calendering (rolling) is impossible.

According to the invention, the sealing type penetration form of rubber is a form as shown in FIG. 3a wherein a portion of the cord having an inner space (defined by the filaments, an outline of which being shown by dotted lines) completely filled with the penetrated rubber and a longitudinal length $l_1$ is alternately connected with a portion of the cord having an inner space incompletely filled with the penetrated rubber and a longitudinal length $l_2$ in the longitudinal direction of the cord so as to satisfy $l_2$ of not more than 10 mm and $l_1/l_2$ of not less than 0.14. The sectional shapes of the cord taken along lines I—I and II—II of FIG. 3a in a direction perpendicular to the longitudinal direction of the cord are different from each other in the presence or absence of the incompletely filled inner space as shown in FIGS. 3b and 3c.

The conventional high extensible cord is not a sealing type because the penetration of rubber is difficult and the length of the incompletely filled inner space (equal to $l_2$) is more than 10 mm or extends to the whole of the cord, so that water can easily to penetrate into the inside of the cord along the cord direction. On the contrary, the cord according to the invention brings about the easy penetration of rubber and is a sealing type penetration form to prevent the progress of water in the inside of the cord. Further, the cords according to the invention have no drawbacks that the tensile strength per weight is low and the cost per weight is high as in the conventional cord of the strand construction.

Figure 4B:
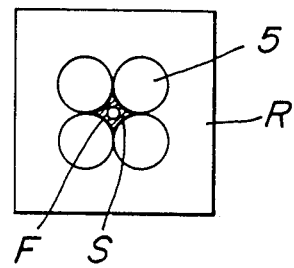

According to the invention, the measurement of rubber penetrability is carried out as follows. That is, the cord is taken out from a new tire and then embedded in a fluidizable resin as shown in FIG. 4a, which is cured and cut at a measuring position along a plane R perpendicular to the cord direction by means of a cutter. The cut plane (FIG. 4b) is photographed after the buffing, from which is measured a ratio of total area S of rubber penetration (shadowed region) in an area F surrounded by filaments 5 (defined by a bold line) being 100, whereby the rubber penetrability at the measuring position is determined. Moreover, the above measurement is performed only over a length of one twisting pitch after the buffing is carried out every 1 mm, an average value of which indicates an average rubber penetrability. Although FIG. 4a shows the case of single layer construction, the measurement on the double layer construction is performed in the same manner as in the single layer construction except that the sum of a space in the core and a spaced defined between the core and the sheath before the penetration of rubber is 100.

In any cords of single and double layer constructions according to the invention, it is preferable that when a load is increased from 0.25 kg to 5 kg, an increment of elongation in green cord (hereinafter abbreviated as P.L.E.) is within a range of 0.3~1.5% and an elongation at break is within a range of 3.0~5.5%. This elongation is determined from the shaping ratio and twisting pitch, so that when the elongation is within the above defined range, a space for sufficiently filling rubber can be formed in the inside of the cord.

Moreover, the inventors have made studies with respect to the Young's modulus of the cord used in the cord layers for belt crossing with each other and found the following facts. That is, when the Young's modulus of the cord in the crossing cord layers is within a range of 6,000–13,500 kg/mm$^2$, the effect of enveloping stones or the like when the tire treads on the stones becomes large to considerably improve the resistance to TLB without easily causing the tread cut, and also the wear resistance and the restriction of crack length in the third cord layer can be maintained at higher levels, respectively. When the Young's modulus is less than 6,000 kg/mm$^2$, the rigidity of the belt becomes too small to considerably decrease the wear resistance and the crack length in the third cord layer becomes long. While, when the Young's modulus exceeds 13,500 kg/mm$^2$, the enveloping effect is not produced sufficiently and the control of the tread cut can not be developed.

Further, when an innermost cord layer or a first cord layer is cut out at its middle (for example, see FIG. 5c), there are obtained effects similar to the effect of limiting the Young's modulus as mentioned above.

It it is intended to dispose a soft rubber at each side end between second and third cord layers, stress concentration can be prevented at both side ends of these cord layers and also the cracking in the third cord layer can be restricted.

The invention will be described in detail with reference to the following examples and comparative examples.

EXAMPLES 1-13, COMPARATIVE EXAMPLES 1-7

Figure 5A:
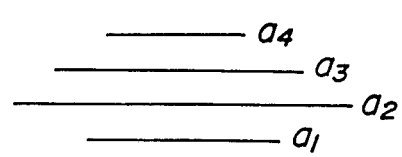
FIGS. 5a to 5d are diagrammatic views illustrating the structure in radial section of the belt composed of four cord layers, respectively.
Figure 5B:
Figure 5C:
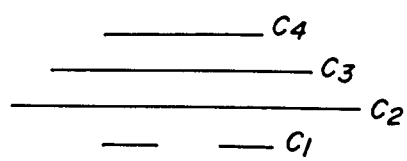
Figure 5D:
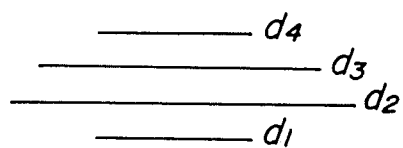
Figure 6:
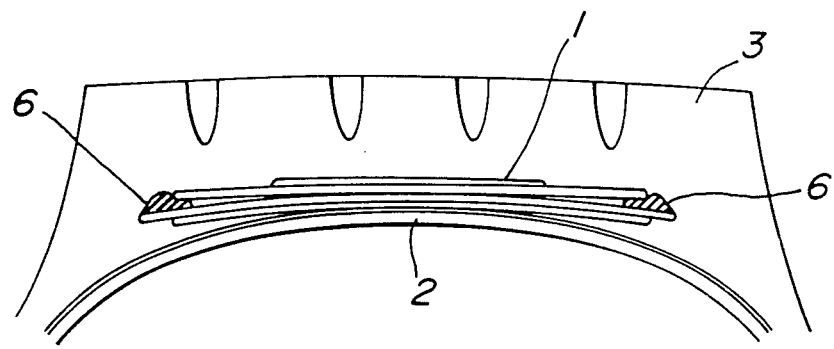
FIGS. 6 to 8 are partially diagrammatic section views of some embodiments of the radial tire according to the invention comprising the belt shown in FIGS. 5a to 5d, respectively.
Figure 7:
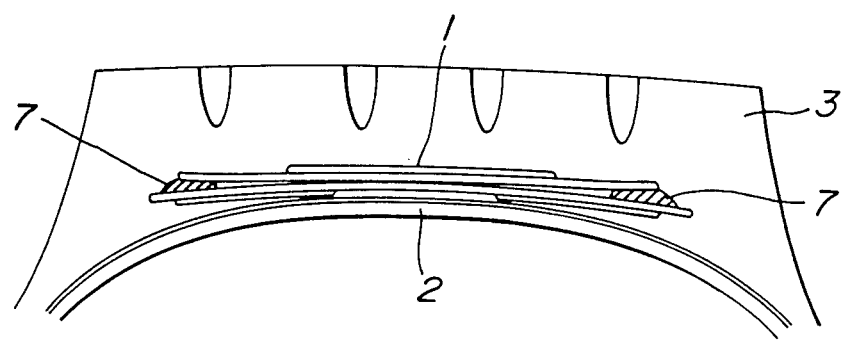
Figure 8:
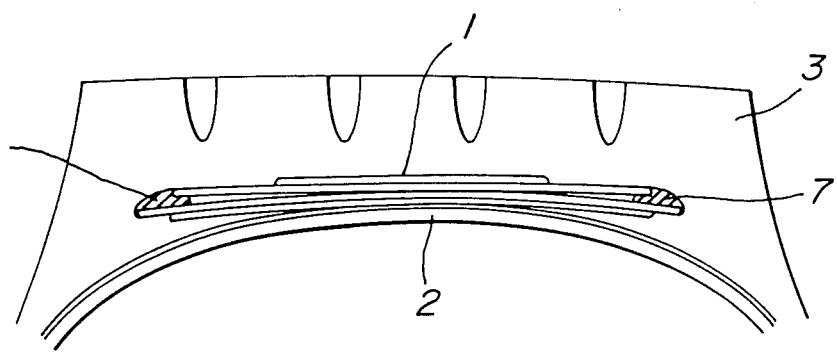

Test tires having a tire size of 1000R 20 VDT as shown in FIGS. 6 to 8 were manufactured by using as a belt 1 four types of belt structures on cord layer arrangement as shown in FIGS. 5a to 5d, respectively, wherein a- and b-types of FIGS. 5a and 5b were applied to the tire of FIG. 6, c-type of FIG. 5c to the tire of FIG. 7, and d-type of FIG. 5d to the tire of FIG. 8. In these a-d types shown in FIGS. 5a-5d, the cord construction of each of first to fourth cord layers viewed from the bottom was shown as follows, provided that the details of the fourth cord layer (i.e. outermost cord layer) were shown in the following Tables 1 and 2 and the cords of the second and third cord layers were crossed with each other.

a-type
   $a_4$: 1×4×0.38 (as an embodiment, the width of this layer corresponds to 62% of tread maximum width in the tire of FIG. 6)
   $a_3$: 3+9+15×0.23+1
      Young's modulus 16,000 kg/mm$^2$
   $a_2$: 3+9+15×0.23+1
      Young's modulus 16,000 kg/mm$^2$
   $a_1$: 3+9×0.23+1
b-type
   $b_4$: 1×5×0.38 (the width of this layer corresponds to 62% of tread maximum width in the tire of FIG. 6)
   $b_3$: 3+9+15×0.23+1
      Young's modulus 11,000 kg/mm$^2$
   $b_2$: 3+9+15×0.23+1
      Young's modulus 11,000 Kg/mm$^2$
   $b_1$: 3+9×0.23+1
c-type
   $c_4$: 1×5×0.38 (the width of this layer corresponds to 62% of tread maximum width in the tire of FIG. 7)

$c_3$: 3+9+15×0.23+1
   Young's modulus 16,000 kg/mm$^2$
$c_2$: 3+9+15×0.23+1
   Young's modulus 16,000 kg/mm$^2$
$c_1$: 3+9×0.23+1
d-type
   $d_4$: 1×5×0.38 (the width of this layer corresponds to 62% of tread maximum width in the tire of FIG. 8)
   $d_3$: 3+9+15×0.23+1
      Young's modulus 16,000 kg/mm$^2$
   $d_2$: 3+9+15×0.23+1
      Young's modulus 16,000 kg/mm$^2$
   $d_1$: 3×0.20+6×0.38

The resulting test tires were measured with respect to the rubber penetration form. Further, each of these tires was actually run on general-purpose road including a rough roads of 40% under 100% loading over a distance of 20,000 km, whereby the following properties were evaluated by an index on a basis that the value of Comparative Example 1 (existing tire) is 100, wherein the larger the index value, the better the property. The evaluation of each property was made as follows.

Resistance to TLB

After the actual running, the area of the outermost cord layer peeled off from the tread rubber was measured with respect to each test tire. The larger the index value, the less the peeling and the better the resistance to TLB.

Cord cutting property of outermost cord layer, number of tread cuts

After actual running, the tire tread was taken off from the outermost cord layer for belt to observe the number of cuts arrived at the outermost cord layer. The number of such cuts was evaluated by an index as a number of tread cuts. Further, the presence and number of cord breaking every the arrived cut were measured and the sum of measured cord breaking numbers was evaluated by an index as a cord cutting property of outermost cord layer. In this measurement, three samples were taken out from the tire of 1000R 20 at arbitrary three positions in the circumferential direction, each having a width of 9 cm and a length of 20 cm along the circumferential direction.

Crack length at side end of third cord layer

The side end of the third cord layer was exposed by peeling off the tread rubber from the third cord layer and then the crack length l produced in this layer was measured with a caliper. The larger the index value, the shorter the crack length.

Wear Resistance

When the depth of tread groove in new tire was A, the remaining groove depth B was measured after the running over a distance X km, from which a difference A−B was determined. Then, the running distance until the complete wearing of the tire is predicted from X/A−B, which is evaluated by an index as a wear resistance.

The structures and measured results of these test tires are shown in Tables 1 and 2.

TABLE 1(a)

|  | Example 1 | Example 2 | Example 3 | Example 4 | Example 5 | Example 6 | Example 7 |
|---|---|---|---|---|---|---|---|
| Belt structure | a | a | a | a | a | b | c |
| Cord of outermost cord layer | | | | | | | |
| construction and filament diameter (mm) | 1 × 5 × 0.38 | 1 × 4 × 0.38 | 2 + 7 × 0.30 | 2 + 6 × 0.30 | 1 + 5 × 0.35 | 1 × 5 × 0.38 | 1 × 5 × 0.38 |
| volume fraction (%) | 15 | 15 | 20 | 19 | 17 | 15 | 15 |
| twisting angle (degree) | 13 | 13 | 11 | 18 | 19 | 13 | 13 |
| P.L.E. (%) | 0.7 | 0.6 | 0.6 | 1.0 | 1.2 | 0.7 | 0.7 |
| elongation at break (%) | 4.6 | 4.3 | 3.5 | 4.8 | 5.1 | 4.6 | 4.6 |
| rubber penetration form | sealing type | sealing type | sealing type | sealing type | sealing type | sealing type | sealing type |
| $l_1$ (mm) | 4.0 | 3.0 | 3.0 | 2.5 | 2.2 | 4.0 | 4.0 |
| $l_2$ (mm) | 8.0 | 7.0 | 10.0 | 7.0 | 6.0 | 8.0 | 8.0 |
| $l_1/l_2$ | 0.50 | 0.43 | 0.30 | 0.36 | 0.37 | 0.50 | 0.50 |
| rubber penetrability (%) | 85 | 90 | 87 | 90 | 90 | 85 | 85 |
| shaping ratio (%) | 96 | 98 | 95/98*[1] | 95/99*[1] | 101 | 96 | 96 |
| Young's modulus of cord in crossing cord layers (kg/mm$^2$) | 16,000 | 16,000 | 16,000 | 16,000 | 16,000 | 11,000 | 16,000 |
| Test results of tire | | | | | | | |
| resistance to TLB [index] | 200 | 180 | 210 | 205 | 200 | 230 | 250 |
| cutting property of cord in outermost cord layer [index] | 200 | 180 | 210 | 205 | 200 | 230 | 250 |
| crack length at end of third cord layer [index] | 100 | 100 | 100 | 100 | 100 | 98 | 100 |
| number of tread cuts [index] | 100 | 100 | 100 | 100 | 100 | 125 | 130 |
| wear resistance [index] | 100 | 100 | 100 | 100 | 100 | 98 | 97 |

*[1]In case of double layer construction, shaping ratio is shown on core layer and sheath layer, respectively.

TABLE 1(b)

|  | Example 8 | Example 9 | Example 10 | Example 11 | Example 12 | Example 13 |
|---|---|---|---|---|---|---|
| Belt structure | d | a | a | a | b | b |
| Cord of outermost cord layer | | | | | | |
| construction and filament | 1 × 5 × 0.38 | 1 × 5 × 0.25 | 1 × 5 × 0.45 | 1 × 3 × 0.38 | 1 × 5 × 0.38 | 1 × 5 × 0.38 |

TABLE 1(b)-continued

|  | Example 8 | Example 9 | Example 10 | Example 11 | Example 12 | Example 13 |
| --- | --- | --- | --- | --- | --- | --- |
| diameter (mm) |  |  |  |  |  |  |
| volume fraction (%) | 15 | 15 | 25 | 14 | 15 | 15 |
| twisting angle (degree) | 13 | 13 | 13 | 13 | 13 | 13 |
| P.L.E. (%) | 0.7 | 0.7 | 0.7 | 0.7 | 0.7 | 0.7 |
| elongation at breake (%) | 4.6 | 4.5 | 4.7 | 4.4 | 4.6 | 4.6 |
| rubber penetration form | sealing type | sealing type | sealing type | sealing type | sealing type | sealing type |
| $l_1$ (mm) | 4.0 | 3.0 | 5.0 | 2.5 | 4 | 4.0 |
| $l_2$ (mm) | 8.0 | 7.0 | 10.0 | 6 | 8 | 8.0 |
| $l_1/l_2$ | 0.50 | 0.43 | 0.50 | 0.42 | 0.50 | 0.50 |
| rubber penetrability (%) | 85 | 88 | 78 | 72 | 85 | 85 |
| shaping ratio (%) | 96 | 97 | 95 | 103 | 96 | 96 |
| Young's modulus of cord in crossing cord layers (kg/mm$^2$) | 16,000 | 16,000 | 16,000 | 16,000 | 4,000 | 7,000 |
| Test results of tire |  |  |  |  |  |  |
| resistance to TLB [index] | 200 | 160 | 150 | 190 | 250 | 235 |
| cutting property of cord in outermost cord layer [index] | 200 | 110 | 100 | 160 | 250 | 235 |
| crack length at end of third cord layer [index] | 150 | 100 | 100 | 100 | 80 | 95 |
| number of tread cuts [index] | 100 | 100 | 100 | 100 | 150 | 130 |
| wear resistance [index] | 100 | 100 | 100 | 100 | 85 | 95 |

TABLE 2

|  | Comparative example 1 | Comparative example 2 | Comparative example 3 | Comparative example 4 | Comparative example 5 | Comparative example 6 | Comparative example 7 |
| --- | --- | --- | --- | --- | --- | --- | --- |
| Belt structure | a | a | a | a | a | a | a |
| Cord of outermost cord layer |  |  |  |  |  |  |  |
| construction and filament diameter (mm) | 1 × 3 × 0.20 + 6 × 0.38 | 4 × 4 × 0.23 | 1 × 5 × 0.38 | 1 × 5 × 0.38 | 1 × 5 × 0.38 | 1 × 6 × 0.38 | 1 × 5 × 0.38 |
| volume fraction (%) | 13 | 10 | 4 | 15 | 15 | 18 | 15 |
| twisting angle (degree) | 12 | 40 | 13 | 8 | 30 | 13 | 11 |
| P.L.E. (%) | 0.1 | 1.8 | 0.7 | 0.1 | 2.0 | 0.5 | 0.4 |
| elongation at breake (%) | 2.5 | 6.0 | 4.6 | 3.0 | 6.5 | 4.0 | 2.9 |
| rubber penetration form | non-sealing type | non-sealing type | sealing type | sealing type | non-sealing type | non-sealing type | non-sealing type |
| $l_1$ (mm) | 0 | 0 | 4.0 | 2.5 | 0 | 0 | 0 |
| $l_2$ (mm) | whole length of cord | whole length of cord | 8.0 | 14.0 | whole length of cord | whole length of cord | whole length of cord |
| $l_1/l_2$ | 0 | 0 | 0.50 | 0.18 | 0 | 0 | 0 |
| rubber penetrability (%) | 40 | 50 | 85 | 60 | 10 | 5 | <1 |
| shaping ratio (%) | 95/97 | 100 | 96 | 94 | 95 | 95 | 87 |
| Young's modulus of cord in crossing cord layers (kg/mm$^2$) | 16,000 | 16,000 | 16,000 | 16,000 | 16,000 | 16,000 | 16,000 |
| Test results of tire |  |  |  |  |  |  |  |
| resistance to TLB [index] | 100 | 100 | 200 | 120 | 130 | 110 | 100 |
| cutting property of cord in outermost cord layer [index] | 100 | 300 | 200 | 110 | 250 | 200 | 150 |
| crack length at end of third cord layer [index] | 100 | 100 | 100*2 | 100 | 100 | 100 | 100 |
| number of tread cuts [index] | 100 | 100 | 100 | 100 | 100 | 100 | 100 |
| wear resistance [index] | 100 | 100 | 100 | 100 | 100 | 100 | 100 |

*2In the third cord layer, the crack length at the layer end is particularly unchanged, but cut-through failure becomes large.

Examples 1 and 2 and Comparative Example 7 are 96%, 98% and 87% in the shaping ratio, from which it is obvious that the shaping ratio close to 100% is necessary to render the cord to a sealing type penetration form.

In Examples 3 and 4 and Comparative Example 1, the number of filaments in the core is 2, 2 and 3, respectively. The cords of double layer construction comprising a core of 2 filaments (Examples 3 and 4) exhibit a sealing type rubber penetration form, while the cords of double layer construction comprising a core of 3 filaments (Comparative Example 1) exhibit a non-sealing type rubber penetration form because the rubber hardly penetrates into the inside of the cord.

Examples 1 and 5 and Comparative Examples 4 and 5 show an influence of twisting angle. In Comparative Example 4, the twisting angle is as small as 8°, so that the cord cutting property is poor and the resistance of TLB is degraded. In Comparative Example 5, the twisting angle is as extremely large at 30°, so that the rubber penetration form is a non-sealing type and the resistance to TLB is degraded. In Examples 1 and 5, the twisting angle is 13° and 19°, which are within the range defined in the invention (10°–20°), so that the rubber penetration form is a sealing type.

When comparing Examples 1, 6, 12 and 13 on the Young's modulus of the cord in the cord crossing layers, the Young's modulus is extremely low in Example 12, which shows the improvement in the resistance to TLB, resistance to tread cuts and cord cutting property of outermost cord layer but the some degradation in the wear resistance and crack length at each side end of third cord layer.

Example 7 shows an effect when the first cord layer is cut out at the middle, and in this case the resistance to TLB, resistance to tread cuts and cord cutting property of outermost cord layer are improved but the wear resistance is somewhat degraded.

Example 8 shows an effect by disposing a soft rubber (100% modulus: 30 kg/cm$^2$, which corresponds to a half of that of the coating rubber for use in the usual belt) between each side end of the second cord layer and each side end of the third cord layer, and in this case the crack length at each side end of the third cord layer is shortened.

Examples 9 and 10 show that the cords of the outermost cord layer are apt to be broken when the diameter of the filament constituting the cord is too small or large, and in this case the resistance to TLB is degraded.

Example 11 is the case of using the cord of 1×3 single layer construction, which shows that such cords can be put to practical use on roads including rough road of 40% as regards the wear resistance.

Comparative Example 2 shows the use of strand construction cords, which is poor in the resistance to TLB owing to its non-sealing type.

In Comparative Example 3, the cord volume fraction is too small, so that the number of cuts reaching to the third cord layer is increased to enhance the risk of cut burst though the crack length at each side end of the third cord layer is particularly unchanged.

Comparative Example 6 shows the use of 1×6 single layer construction cord, and in this case the cord structure is unstable and the filaments easily fall into the inside of the cord to give a non-sealing type penetration form.

As mentioned above, in the large-size pneumatic radial tires for use on rough road according to the invention, the outermost cord layer for the belt is formed by embedding a plurality of twisted steel cords, each having a single layer construction of 1×3, 1×4 or 1×5 or a double layer construction with a core of 1 to 2 filaments obtained by twisting plural steel filaments shaped prior to the formation of cord, in a good penetrable rubber at a cord volume fraction of 5–40% so as to render rubber penetration into a sealing type, whereby the durability in the running on roads inclusive of rough road, particularly the resistance to TLB is improved advantageously as compared with the case of the conventional method being unsatisfactory in the improvement of the durability and bringing about the decrease of cord tensile strength and the rise of the cost.

What is claimed is:

1. A large-size pneumatic radial tire for use on rough road comprising as a tire reinforcement; a carcass ply of cords arranged in a direction substantially perpendicular to the equatorial plane of the tire and a belt composed of at least three cord layers each containing steel cords embedded parallel to each other in rubber and arranged at a relatively small angle with respect to the equatorial plane of the tire, at least two adjacent cord layers of said cord layers of the belt being piled one upon the other to cross their cords with each other at an angle of 15°–30° with respect to the equatorial plane, an outermost cord layer for said belt comprising a cord layer formed by embedding a plurality of twisted steel cords, each having an elongation at break of 3.0–5.5% and a single layer construction of 1×3, 1×4, or 1×5 or a double layer construction with a core of 1 to 2 filaments obtained by twisting plural steel filaments shaped prior to the formation of cord at a twisting angle of 10–20 without a wrap filament in rubber at a cord volume fraction of 5–40%, which is expressed by a percentage of the sum of sectional areas of cords included in an area of a region defined by a bisector between a line passing through centers of the cords in the outermost cord layer for the belt and a line passing through centers of the cords in an inner cord layer adjacent to the outermost cord layer and borderline between the tread and the outermost cord layer in section perpendicular to the circumferential direction of the belt, in such a manner that the form of penetrating rubber into the inside of the cord is a sealing type penetration from wherein a portion of the cord having an inner space completely filled with the penetrated rubber and a longitudinal length $l_1$ is alternately connected with a portion of the cord having an inner space incompletely filled with the penetrated rubber and a longitudinal length $l_2$ in the longitudinal direction of the cord so as to satisfy $l_2$ of not more than 10 mm and $l_1/l_2$ of not less than 0.14.

2. The radial tire according to claim 1, wherein said cord has an increment of elongation in green cord of 0.3~1.5% when a load is increased from 0.25 kg to 5 kg.

3. The radial tire according to claim 1, wherein single layer construction is 1×4 or 1×5 construction having a filament diameter of 0.30~0.40 mm.

4. The radial tire according to claim 1, wherein said double layer construction is 2+7 or 2+6 construction having a filament diameter of 0.23~0.43 mm.

5. The radial tire according to claim 1, wherein said cord is a cord of 2+6 or 2+7 double layer construction having a shaping ratio of 93~110%.

6. The radial tire according to claim 1, wherein said cord is a cord of 1×4 or 1×5 single layer construction having a shaping ratio of 95~110%.

7. The radial tire according to claim 1, wherein cords in said adjacent crossing cord layers are steel cord having a Young's modulus of 6,000~13,500 kg/mm$^2$.

* * * * *